United States Patent
Yoshikawa et al.

(10) Patent No.: US 12,337,832 B2
(45) Date of Patent: Jun. 24, 2025

(54) DRIVING ASSISTANCE APPARATUS

(71) Applicant: SUBARU CORPORATION, Tokyo (JP)

(72) Inventors: Hikaru Yoshikawa, Tokyo (JP); Masahito Sekine, Tokyo (JP); Yuta Sato, Tokyo (JP); Ryuya Azuma, Tokyo (JP); Keisuke Motegi, Tokyo (JP); Yu Hasegawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 294 days.

(21) Appl. No.: 17/866,929

(22) Filed: Jul. 18, 2022

(65) Prior Publication Data

US 2023/0031826 A1 Feb. 2, 2023

(30) Foreign Application Priority Data

Jul. 28, 2021 (JP) .................... 2021-123499

(51) Int. Cl.
*B60W 30/09* (2012.01)
*B60W 50/14* (2020.01)
(Continued)

(52) U.S. Cl.
CPC ............ *B60W 30/09* (2013.01); *B60W 50/14* (2013.01); *G08G 1/0112* (2013.01);
(Continued)

(58) Field of Classification Search
CPC ............. B60W 30/09; B60W 2556/40; B60W 2555/60; B60W 30/18163; B60W 50/14;
(Continued)

(56) References Cited

U.S. PATENT DOCUMENTS 6,057,754 A * 5/2000 Kinoshita ................ B62D 1/28
348/148
2011/0222732 A1* 9/2011 Higuchi ................ G08G 1/167
382/104
(Continued)

FOREIGN PATENT DOCUMENTS

DE 102017223093 A1 * 6/2019
JP 2011-070550 A 4/2011
(Continued)

OTHER PUBLICATIONS

Translation and original copies of foreign patent literature provided in combined pdf file.*
(Continued)

*Primary Examiner* — Thomas E Worden
*Assistant Examiner* — Benjamin J Brosh
(74) *Attorney, Agent, or Firm* — Rimon P.C.

(57) ABSTRACT

A driving assistance apparatus includes an outside recognition device, a locator unit, and a driving control unit. The outside recognition device is configured to acquire traffic environment information around the vehicle. The locator unit is configured to store road map information and detect a position of the vehicle based on a positioning signal. The driving control unit is configured to control the vehicle based on forward traffic environment information acquired by the outside recognition device. The driving control unit is configured to execute a wrong-way driving detection process and a restricted traffic zone determination process to determine whether the vehicle is performing wrong-way driving in an oncoming lane. The wrong-way driving detection process involves detecting wrong-way driving of the vehicle from the traffic environment information, and the restricted traffic zone determination process involves detect-
(Continued)

ing a restricted traffic zone in a driving lane of the vehicle from the traffic environment information.

11 Claims, 8 Drawing Sheets

(51) Int. Cl.
  *G08G 1/01* (2006.01)
  *G08G 1/0967* (2006.01)
(52) U.S. Cl.
  CPC ... *G08G 1/096766* (2013.01); *B60W 2552/53* (2020.02); *B60W 2555/60* (2020.02); *B60W 2556/40* (2020.02)
(58) Field of Classification Search
  CPC ...... B60W 2552/53; B60W 2254/4046; G08G 1/0112; G08G 1/096725; G08G 1/09626; G08G 1/09623
  See application file for complete search history.

(56) References Cited

U.S. PATENT DOCUMENTS

| | | | | |
|---|---|---|---|---|
| 2013/0238192 A1* | 9/2013 | Breu | ................... | B62D 15/029 701/41 |
| 2014/0350837 A1* | 11/2014 | Galbas | ................. | B60W 30/09 701/301 |
| 2016/0003630 A1 | 1/2016 | Higuchi | | |
| 2016/0046290 A1* | 2/2016 | Aharony | ............... | B60W 10/20 701/41 |
| 2016/0121886 A1* | 5/2016 | Eigel | ................... | B60W 30/095 701/23 |
| 2017/0205235 A1* | 7/2017 | Vladimerou | ....... | G01C 21/1652 |
| 2018/0370528 A1* | 12/2018 | Rittger | ................. | G06V 20/588 |
| 2019/0204830 A1* | 7/2019 | Ogura | ................. | B60W 50/029 |
| 2019/0286926 A1* | 9/2019 | Miura | ................. | G06V 20/588 |
| 2020/0298858 A1* | 9/2020 | Stenneth | ......... | B60W 30/18163 |
| 2020/0372262 A1* | 11/2020 | Ma | ........................ | B60W 40/04 |
| 2021/0001893 A1* | 1/2021 | Etcheverry | ........... | B60W 30/12 |
| 2021/0016772 A1* | 1/2021 | Golov | ................. | G06V 20/584 |
| 2021/0155288 A1 | 5/2021 | Takano | | |
| 2021/0237581 A1* | 8/2021 | Rajaie | ...................... | B60T 7/18 |
| 2022/0083073 A1* | 3/2022 | Silver | ................... | G06V 20/56 |
| 2022/0185312 A1* | 6/2022 | Hegde | ................... | G08G 1/056 |

FOREIGN PATENT DOCUMENTS

| | | |
|---|---|---|
| JP | 2014-157395 A | 8/2014 |
| JP | 2016-062443 A | 4/2016 |
| JP | 2017-207920 A | 11/2017 |
| JP | 2019-012428 A | 1/2019 |
| JP | 2020-173500 A | 10/2020 |
| JP | 2022-120947 A | 8/2022 |
| WO | WO-2021086781 A1 * | 5/2021 ............ B60W 30/09 |

OTHER PUBLICATIONS

DE 102017223093 A1, Fendt, "Method for controlling a driver assistance system", Filed Dec. 18, 2017, Pub Jun. 19, 2019, English Translation provided by IP.com (Year: 2019).*
Office Action dated Jan. 21, 2025, from corresponding Japanese Patent Application No. 2021-123499, 8 pages.

* cited by examiner

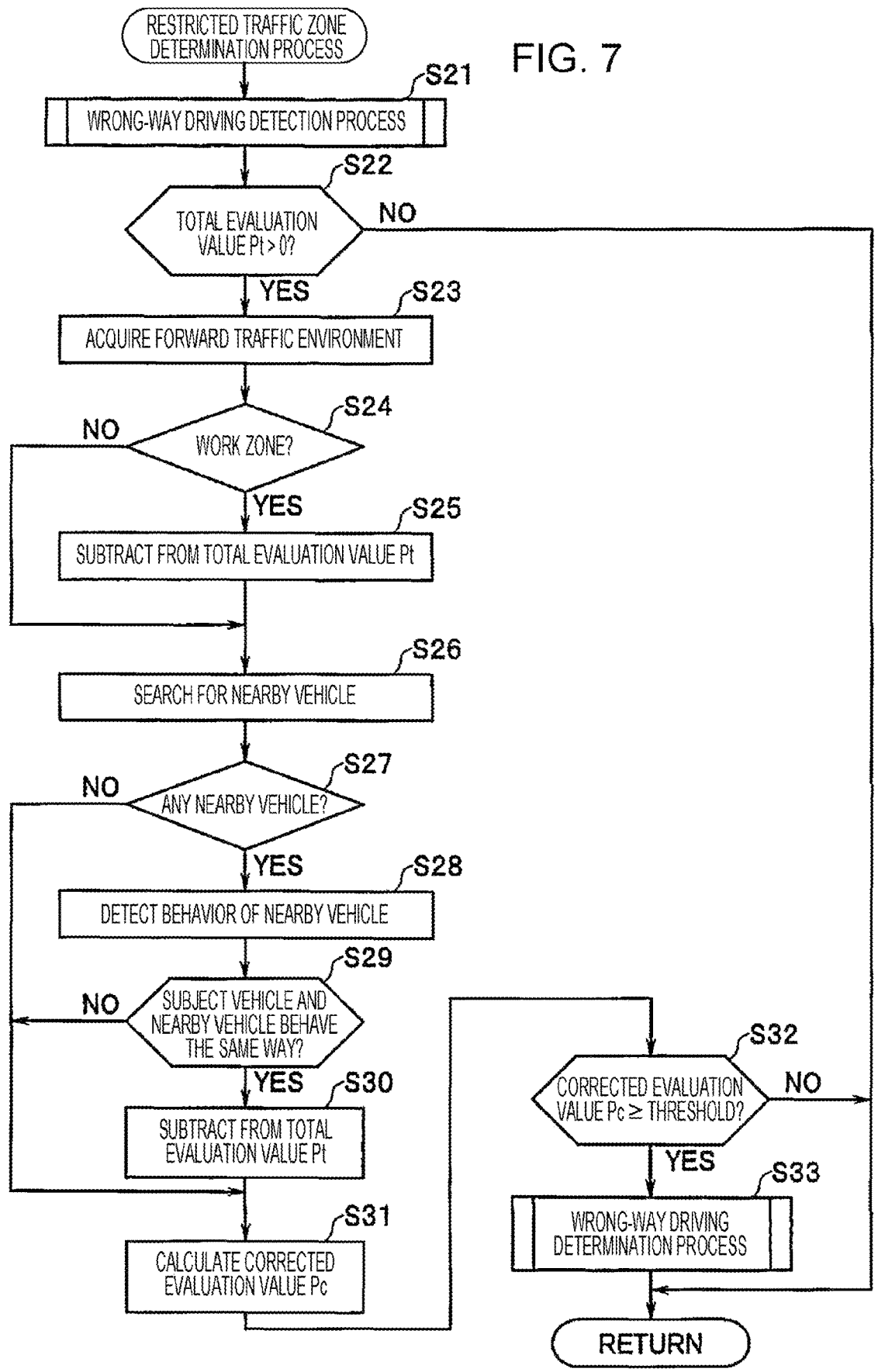

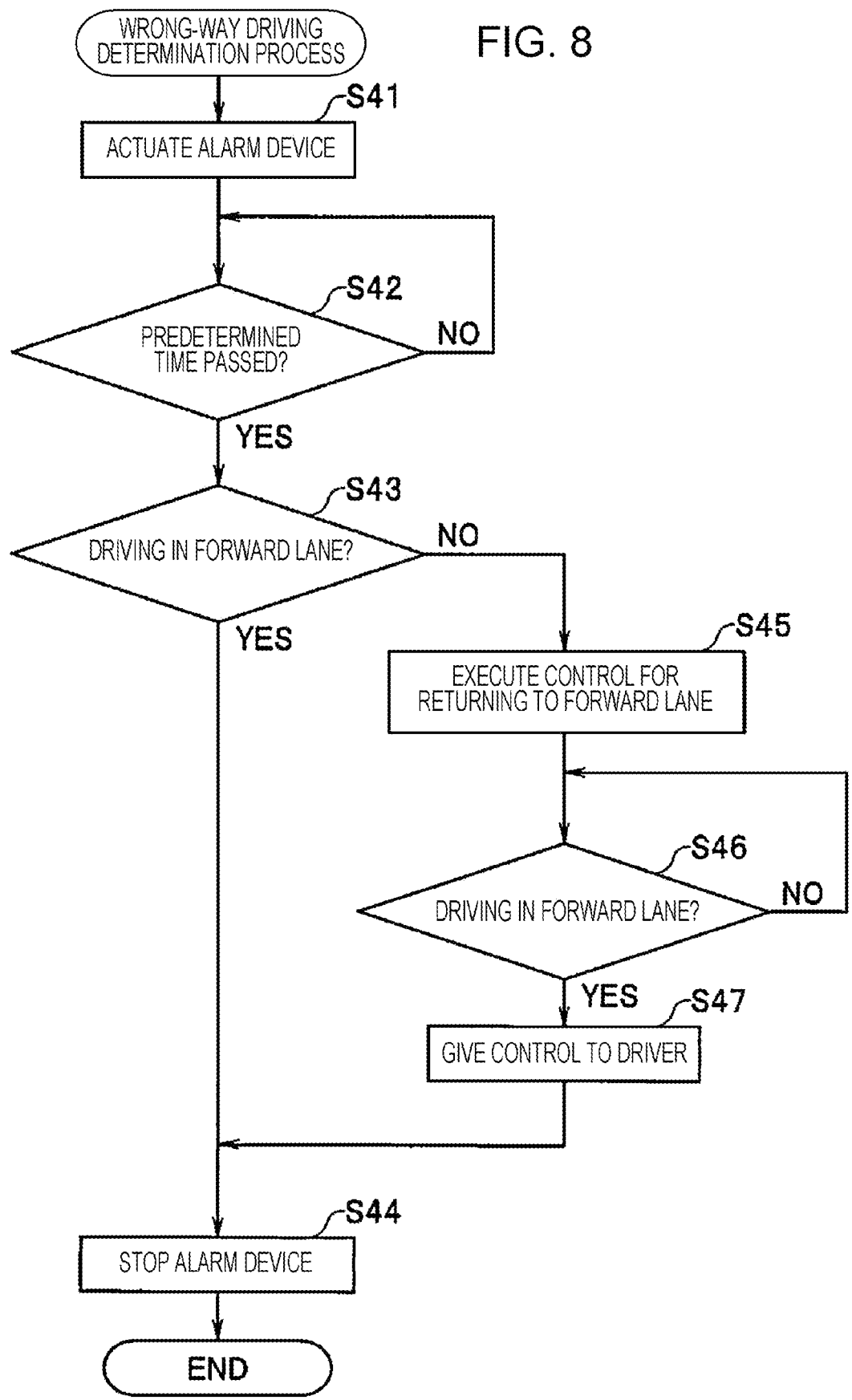

DRIVING ASSISTANCE APPARATUS

CROSS-REFERENCE TO RELATED APPLICATIONS

The present application claims priority from Japanese Patent Application No. 2021-123499 filed on Jul. 28, 2021, the entire contents of which are hereby incorporated by reference.

BACKGROUND

The disclosure relates to a driving assistance apparatus that makes a determination of wrong-way driving on the basis of whether there is a restricted traffic zone, such as a work zone.

Wrong-way driving, which is a driver's act of driving a vehicle against a legally designated direction, has been an issue. In recent years, techniques have been known in which, if a vehicle driving in a direction opposite that of a subject vehicle is detected, the subject vehicle or the detected vehicle is determined to be driving the wrong way depending on the situation, and the corresponding notice is given to the driver of the subject vehicle.

For example, Japanese Unexamined Patent Application Publication (JP-A) No. 2017-207920 discloses a technique in which a vehicle driving in front of a subject vehicle is analyzed to determine the direction of the subject vehicle, so as to determine whether the subject vehicle is driving the wrong way.

Also, for example, JP-A No. 2016-62443 discloses a technique in which a determination of whether a subject vehicle or a preceding vehicle is driving the wrong way is made on the basis of the velocity of the subject vehicle relative to the preceding vehicle. JP-A No. 2016-62443 also discloses a technique in which, from a velocity relative to a vehicle driving alongside, a determination is made as to which of the subject vehicle and the preceding vehicle is a vehicle driving the wrong way.

SUMMARY

An aspect of the disclosure provides a driving assistance apparatus to be applied to a vehicle. The driving assistance apparatus includes an outside recognition device, a locator unit, and a driving control unit. The outside recognition device is configured to acquire traffic environment information around the vehicle. The locator unit is configured to store road map information and detect a position of the vehicle on a basis of a positioning signal. The driving control unit is configured to control the vehicle on a basis of forward traffic environment information acquired by the outside recognition device. The driving control unit is configured to execute a wrong-way driving detection process and a restricted traffic zone determination process to determine whether the vehicle is performing wrong-way driving in an oncoming lane. The wrong-way driving detection process involves detecting wrong-way driving of the vehicle from the traffic environment information, and the restricted traffic zone determination process involves detecting a restricted traffic zone in a driving lane of the vehicle from the traffic environment information.

An aspect of the disclosure provides a driving assistance apparatus to be applied to a vehicle. The driving assistance apparatus includes an outside recognition device and circuitry. The outside recognition device is configured to acquire traffic environment information around the vehicle. The circuitry is configured to store road map information. The circuitry is configured to detect a position of the vehicle on a basis of a positioning signal. The circuitry is configured to control the vehicle on a basis of forward traffic environment information acquired by the outside recognition device. The circuitry is configured to execute a wrong-way driving detection process and a restricted traffic zone determination process to determine whether the vehicle is performing wrong-way driving in an oncoming lane. The wrong-way driving detection process involves detecting wrong-way driving of the vehicle from the traffic environment information, and the restricted traffic zone determination process involves detecting a restricted traffic zone in a driving lane of the vehicle from the traffic environment information.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

FIG. 7 is a control flowchart illustrating a restricted traffic zone determination process for determining a restricted traffic zone or work zone, executed by the driving control unit; and FIG. 8 is a control flowchart illustrating a wrong-way driving determination process executed by the driving control unit.

DETAILED DESCRIPTION

When an original driving lane in a designated direction has a restricted traffic zone, such as a work zone for road work, a vehicle may not be able to go beyond the restricted traffic zone without swerving into an oncoming lane. With the techniques of the related art for determining the occurrence of wrong-way driving, such an act of swerving may be erroneously determined to be wrong-way driving.

The disclosure has been made in view of the circumstances described above. It is desirable to provide a driving assistance apparatus that can prevent an erroneous determination of wrong-way driving when a vehicle cannot drive in an original driving lane in a designated direction due to the presence of a restricted traffic zone.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
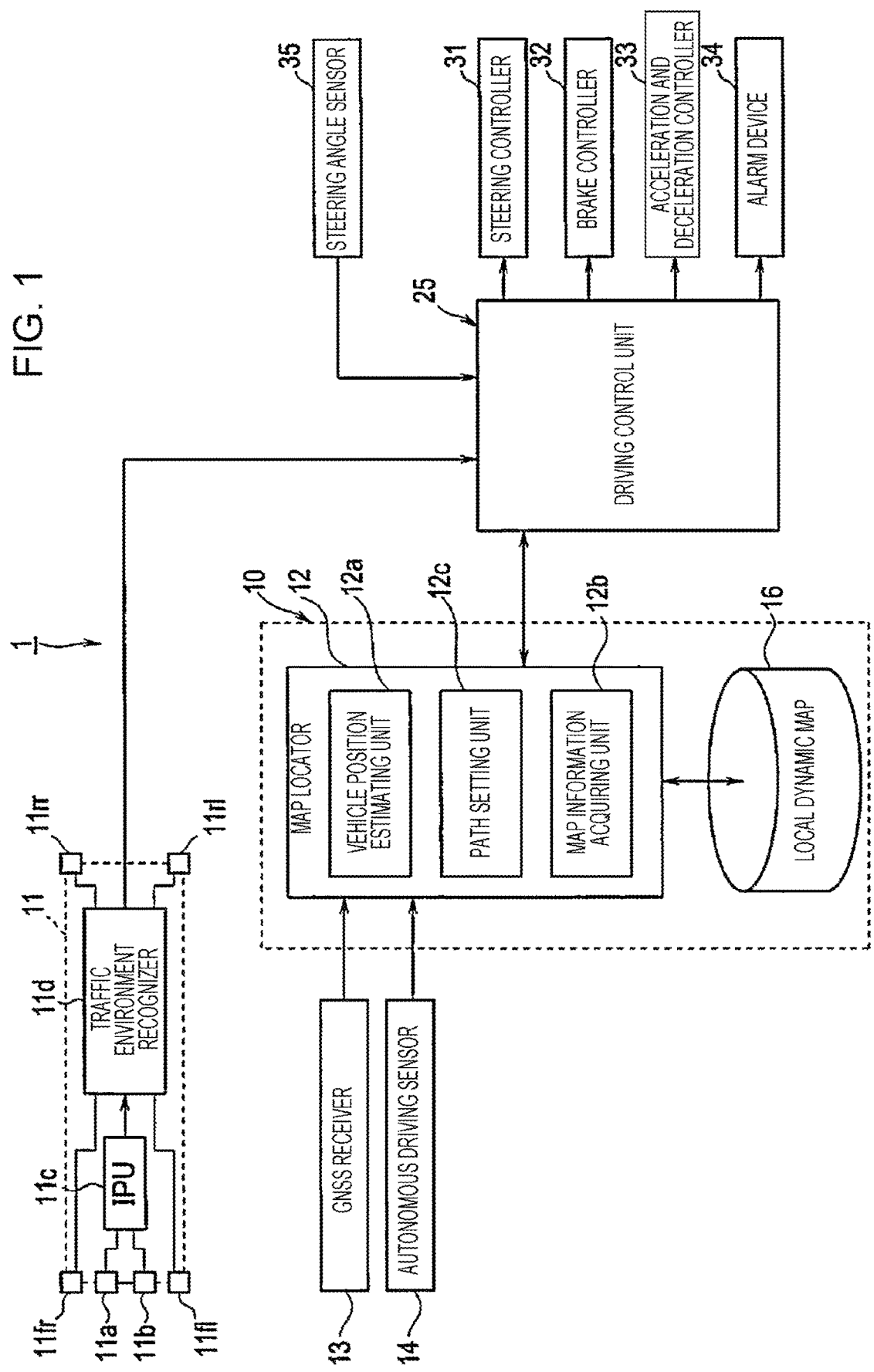
FIG. 1 illustrates a configuration of a driving assistance apparatus.

An embodiment of the disclosure will now be described on the basis of the drawings. A driving assistance apparatus 1 illustrated in FIG. 1 is mounted on a vehicle M (see FIG. 2). The driving assistance apparatus 1 includes a locator unit 10 configured to detect a position of the vehicle M, and a traffic environment recognizing unit 11 serving as an autonomous sensor unit configured to recognize a traffic environment in front of the vehicle M. Note that the vehicle M is also referred to as a subject vehicle.

The locator unit 10 and the traffic environment recognizing unit 11 construct a redundant system so that even if one unit fails, the other unit can temporarily continue to provide driving assistance. In the driving assistance apparatus 1, the locator unit 10 and the traffic environment recognizing unit 11 are configured to constantly monitor the shape of the road the vehicle M is currently driving on, to see whether it stays the same. Then, if the road shape stays the same, the locator unit 10 and the traffic environment recognizing unit 11 continue to provide the driving assistance.

The locator unit 10 estimates the position of the vehicle M (subject vehicle position) on a road map, and acquires road map data of a region in front of the subject vehicle position. A stereo camera system of the traffic environment recognizing unit 11 determines the road curvature in the center of right and left traffic lines that define the driving lane of the vehicle M, and detects the lateral deviation of the vehicle M in the vehicle width direction, with respect to the center of the right and left traffic lines.

The traffic environment recognizing unit 11 serving as an autonomous sensor unit, which is an outside recognition device, is secured, for example, to the upper center of the front part of the vehicle cabin. The traffic environment recognizing unit 11 includes an on-vehicle camera system (or stereo camera system) composed of a main camera 11*a* and a sub-camera 11*b*, an image processing unit (IPU) 11*c*, and a traffic environment recognizer 11*d*. Instead of including the stereo camera system, the traffic environment recognizing unit 11 may include, for example, a traffic environment recognition device which combines a monocular camera with a front radar.

Figure 2:
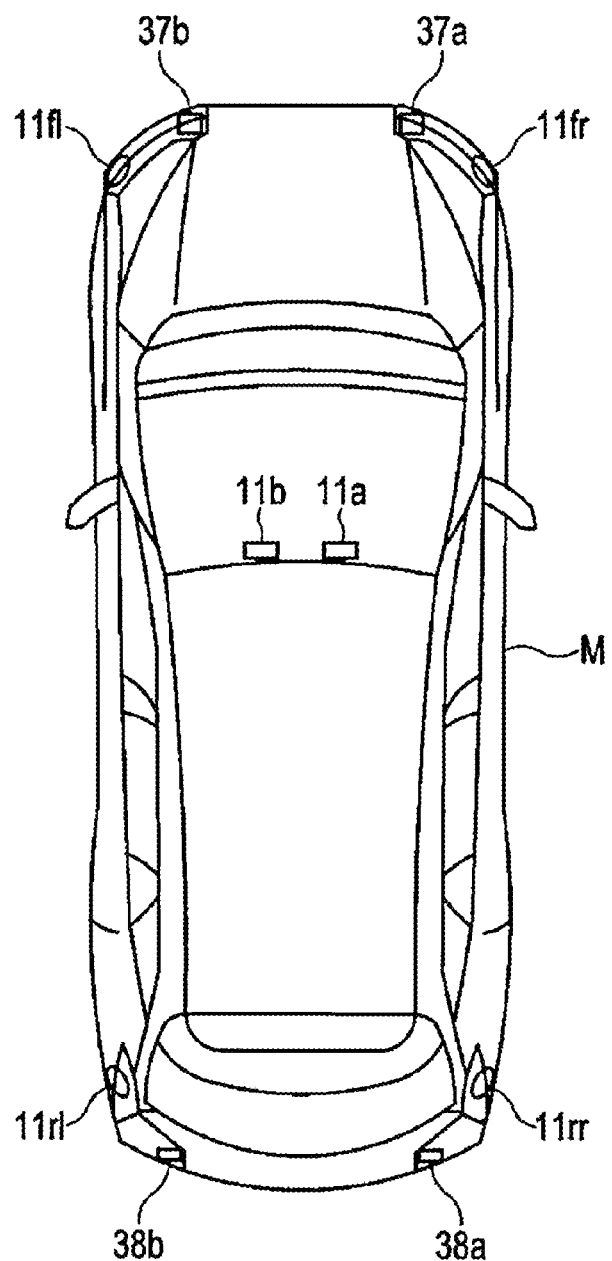
FIG. 2 is a top view of a vehicle having an autonomous sensor mounted thereon.

The main camera 11*a* and the sub-camera 11*b* serve as, for example, an autonomous sensor that is configured to sense a real space in front of the vehicle M. For example, as illustrated in FIG. 2, the main camera 11*a* and the sub-camera 11*b* are arranged on the upper part of one side of the windshield adjacent to the vehicle cabin, in such a way as to be symmetrical right and left with respect to the center in the vehicle width direction. The main camera 11*a* and the sub-camera 11*b* are configured to stereo-capture a region in front of the vehicle M from different points of view.

The IPU 11*c* applies predetermined image processing to forward traffic environment image information of the region in front of the vehicle M captured by both of the cameras 11*a* and 11*b*, and generates forward traffic environment image information (range image information) including range information determined from the amount of positional displacement of the corresponding object. The traffic environment recognizer 11*d* determines traffic lane lines (or hereinafter simply referred to as lane lines) that define roads around the vehicle M on the basis of, for example, range image information received from the IPU 11*c*. The forward traffic environment image is a color image and the traffic environment recognizer 11*d* also recognizes the colors of the lane lines.

The traffic environment recognizer 11*d* determines the road curvature (1/m) of right and left lane lines defining the driving path (subject vehicle driving lane) traveled by the vehicle M, and also determines the width between the right and left lane lines (lane width). Various ways of determining the road curvature and the lane width are known. To determine the road curvature, for example, the traffic environment recognizer 11*d* binarizes the forward traffic environment image information by using a luminance difference to recognize the right and left lane lines, and then solves a curve approximation equation using the least squares method to determine the curvature of the right and left lane lines for each predetermined section.

Also, the traffic environment recognizer 11*d* performs, for example, predetermined pattern matching on the range image information to recognize, for example, obstacles and three-dimensional objects, such as guardrails and curbs along the road as well as pedestrians, two-wheelers, and vehicles other than two-wheelers on the roads around the vehicle M.

To recognize obstacles and three-dimensional objects, the traffic environment recognizer 11*d* recognizes, for example, the type of the three-dimensional object, the distance to the three-dimensional object, the velocity of the three-dimensional object, and the relative velocity between the three-dimensional object and the vehicle M. A three-dimensional object recognized on the basis of an image from the on-vehicle camera system will hereinafter be referred to as a camera object (camera OBJ).

As an autonomous sensor, a plurality of radar devices are coupled to the traffic environment recognizer 11*d*. The radar devices are, for example, a left-front lateral radar device 11*fl*, a right-front lateral radar device 11*fr*, a left-rear lateral radar device 11*rl*, and a right-rear lateral radar device 11*rr*.

For example, as illustrated in FIG. 2, the plurality of radar devices (the left-front lateral radar device 11*fl*, the right-front lateral radar device 11*fr*, the left-rear lateral radar device 11*rl*, and the right-rear lateral radar device 11*rr*) are arranged on the bumpers outside the vehicle cabin in such a way as to be symmetrical with respect to both the center in the front-rear direction and the center in the vehicle width direction.

The left-front lateral radar device 11*fl* and the right-front lateral radar device 11*fr* are configured to monitor two (left and right) regions diagonally in front of, and lateral to, the vehicle M that cannot be monitored through images from the cameras 11*a* and 11*b*. The left-rear lateral radar device 11*rl* and the right-rear lateral radar device 11*rr* are configured to monitor two (left and right) regions lateral to, and behind, the vehicle M that cannot be monitored by the left-front lateral radar device 11*fl* and the right-front lateral radar device 11*fr*.

The radar devices 11*fl*, 11*fr*, 11*rl*, and 11*rr* each include a millimeter-wave radar, a laser radar, and a light detection and ranging (LIDAR) unit. By receiving a reflection of horizontally emitted radar waves (such as radio waves or laser beams), the radar devices 11*fl*, 11*fr*, 11*rl*, and 11*rr* detect a plurality of reflection points on a three-dimensional object around the vehicle M and recognize the three-dimensional object.

Information about a radar OBJ recognized by the radar devices 11*fl*, 11*fr*, 11*rl*, and 11*rr* is received by the traffic environment recognizer 11*d*. This enables the traffic environment recognizer 11*d* to recognize, for example, a preceding vehicle in front of the vehicle M, a vehicle lateral to and driving alongside the vehicle M, a crossing vehicle approaching the vehicle M from a direction crossing the vehicle M's travel path at an intersection or other location, and a succeeding vehicle behind the vehicle M.

Without the left-rear lateral radar device 11*rl* and the right-rear lateral radar device 11*rr*, a back camera may be used to recognize a vehicle rearward of, and driving alongside, the vehicle M or a succeeding vehicle behind vehicle M.

As illustrated in FIG. 1, the locator unit 10 includes a map locator computing unit (map locator) 12 and a high-precision road map database 16 serving as a storage. The map locator 12, the traffic environment recognizer 11*d*, and the driving control unit 25 (described below) are each constituted by a known microcomputer including a CPU, a RAM, a ROM, and a nonvolatile storage and its peripheral devices. For example, programs to be executed by the CPU and fixed data, such as data tables, are stored in advance in the ROM.

A global navigation satellite system (GNSS) receiver 13 and an autonomous driving sensor 14 are coupled to the input side of the map locator 12.

The GNSS receiver 13 receives positioning signals transmitted from a plurality of positioning satellites. The autonomous driving sensor 14 enables autonomous driving in an environment, such as inside a tunnel, where positioning signals cannot be effectively received due to low receiving sensitivity to signals from GNSS satellites. The autonomous driving sensor 14 includes, for example, a vehicle velocity sensor, a yaw-rate sensor, and a forward and backward acceleration sensor.

That is, the map locator 12 performs localization from a travel distance and an azimuth on the basis of, for example, a vehicle velocity detected by the vehicle velocity sensor, a yaw rate (yaw angular velocity) detected by the yaw-rate sensor, and a forward and backward acceleration detected by the forward and backward acceleration sensor.

The map locator 12 includes a subject-vehicle-position estimation computing unit (vehicle position estimating unit) 12*a* configured to estimate the subject vehicle position, a map information acquiring unit 12*b* configured to perform map-matching of the estimated subject vehicle position on the road map to identify the current location of the vehicle M and acquire road map information including environment information around the current location, and a target-travel-path setting computing unit (path setting unit) 12*c* configured to set an intended travel path (target travel path) of the vehicle M.

The road map database 16 is a mass storage medium, such as a hard disk drive (HDD), in which known high-precision road map information (local dynamic map) is stored. The high-precision road map information has a hierarchical structure in which additional map information necessary to support automated driving is superimposed on a static information layer at the bottom corresponding to a substrate.

The map information acquiring unit 12*b* acquires, from the road map information stored in the road map database 16, road map information of the current location and a region in front of the vehicle M. The road map information includes surrounding environment information. The surrounding environment information includes dynamic positional information, as well as static positional information. Examples of the static positional information include road types (e.g., general road, expressway), road shapes, right and left traffic lines, road signs, stop lines, intersections, and traffic lights. Examples of the dynamic positional information include traffic congestion information and restricted traffic zones designated due to accidents and road works.

Then, for example, on the basis of a destination specified by a driver for automated driving, the map information acquiring unit 12*b* acquires, from the road map information, route map information of a route connecting the subject vehicle position (current location) estimated by the vehicle position estimating unit 12*a* to the destination, and transmits the acquired route map information (lane data and its surrounding information on the route map) to the vehicle position estimating unit 12*a*.

The vehicle position estimating unit 12*a* acquires position coordinates of the vehicle M on the basis of a positioning signal received by the GNSS receiver 13, performs map-matching of the position coordinates on the route map information to estimate the subject vehicle position (current location) on the road map and identify the driving lane, acquires the road shape of the driving lane stored as the route map information, and sequentially stores the acquired data.

In an environment, such as inside a tunnel, where effective positioning signals from positioning satellites cannot be received due to reduced sensitivity of the GNSS receiver 13, the vehicle position estimating unit 12*a* switches to autonomous steering and allows the autonomous driving sensor 14 to perform localization.

With reference to the current position map-matched by the map information acquiring unit 12*b*, the path setting unit 12*c* first sets a target travel path for automated driving of the vehicle M along the traffic lines. If a destination has already been entered by the driver, the target travel path is set along a driving route from the current location to the destination.

The target travel path is set to extend several hundred meters to several kilometers in front of the vehicle M and is sequentially updated during driving. The target travel path set by the path setting unit 12*c* is read by the driving control unit 25 serving as an automated driving controller.

The path setting unit 12*c* of the map locator 12 and the traffic environment recognizer 11*d* of the stereo camera system are coupled to the input side of the driving control unit 25.

A steering controller 31 of a steering control device, a brake controller 32 of a braking control device, an acceleration and deceleration controller 33 of an acceleration and deceleration control device, an alarm device 34, and a steering angle sensor 35 are coupled to the output side of the driving control unit 25. The steering controller 31 causes the vehicle M to drive along the target travel path. The brake controller 32 decelerates the vehicle M with forced braking. The acceleration and deceleration controller 33 controls the vehicle velocity of the vehicle M. The steering angle sensor 35 detects a steering rotation angle (not shown).

A direction indicator (blinker) controller (not shown), which is a direction indicator control device, is coupled to the input side of the driving control unit 25. The direction indicator controller receives an ON signal from a direction indicator lever (not shown), which is a direction indicator operation unit (blinker lever), operated by the driver. The alarm device 34 gives an alarm tone, such as voice or beep sound, or alarm display on an instrument panel or a navigation monitor.

The driving control unit 25 controls the steering controller 31, the brake controller 32, and the acceleration and deceleration controller 33 in a predetermined manner to cause the vehicle M to perform automated driving (automated driving control) along the target travel path on the road map set by the path setting unit 12c, on the basis of the positioning signal indicating the subject vehicle position received by the GNSS receiver 13.

On the basis of the forward traffic environment recognized by the traffic environment recognizer 11d, the driving control unit 25 performs known adaptive cruise control (ACC) and active lane keep (ALK). If a preceding vehicle is detected, the driving control unit 25 causes the vehicle M to follow the preceding vehicle, whereas if no preceding vehicle is detected, the driving control unit 25 causes the vehicle M to drive within a speed limit. Also, if a moving object about to cut across immediately in front of the vehicle M is detected, the driving control unit 25 actuates the brake controller 32 to stop the vehicle M.

A relay circuit is built in the direction indicator controller. Of four direction indicators (blinkers) 37a, 37b, 38a, and 38b at the front, rear, right, and left of the vehicle M illustrated in FIG. 2, one of two pairs on the right and left of the vehicle M is illuminated by the driver's operation of the direction indicator lever. Here, for example, the right-front direction indicator 37a and the right-rear direction indicator 38a constitute one pair, and the left-front direction indicator 37b and the left-rear direction indicator 38b constitute the other pair.

An example of controlling a wrong-way driving determination executed by the driving assistance apparatus 1 will now be described in detail. In this example, the control operation is executed while the vehicle M is being manually steered by the driver.

Figure 3:
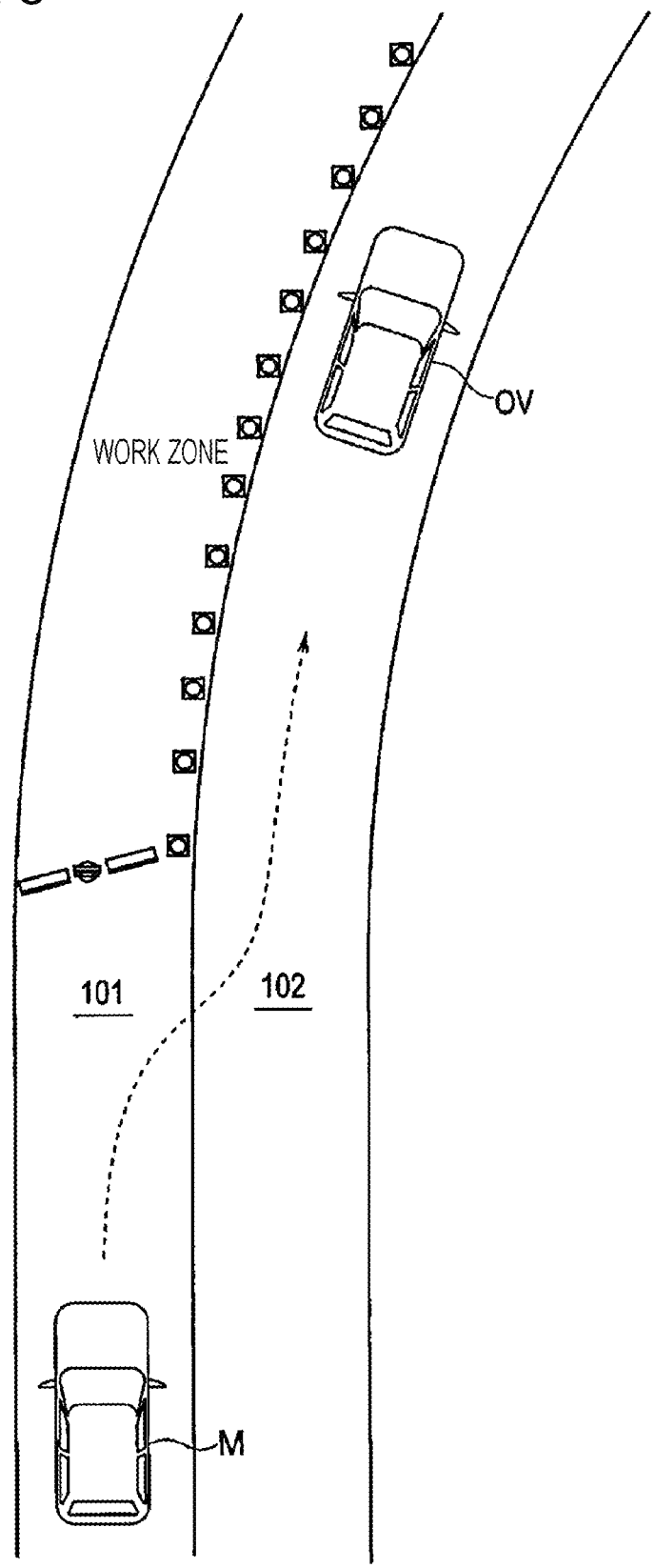
FIG. 3 illustrates a road with a work zone.
Figure 4:
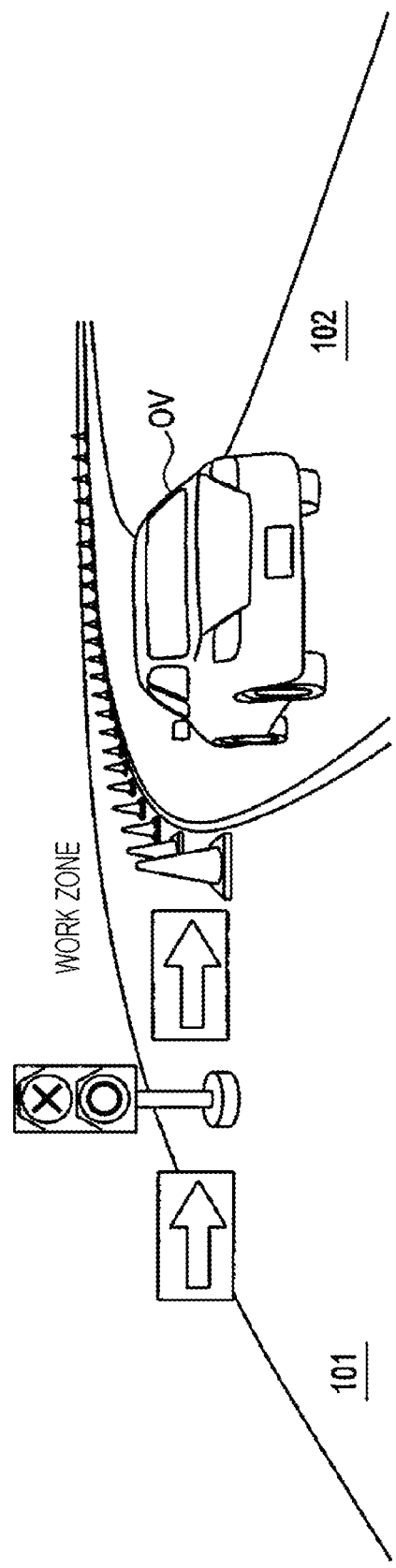
FIG. 4 illustrates how a road with a work zone in front is viewed from inside a vehicle.

As illustrated in FIG. 3 and FIG. 4, if a forward lane 101, which is the subject vehicle driving lane in a designated driving direction, has a restricted traffic zone, which is a work zone such as a road work zone, the vehicle M and another vehicle (preceding vehicle) OV driving in the forward lane 101 are to drive in (or swerve into) an oncoming lane 102. Such a situation is excluded in the wrong-way driving determination control executed by the driving assistance apparatus 1 according to the present embodiment.

Figure 5:
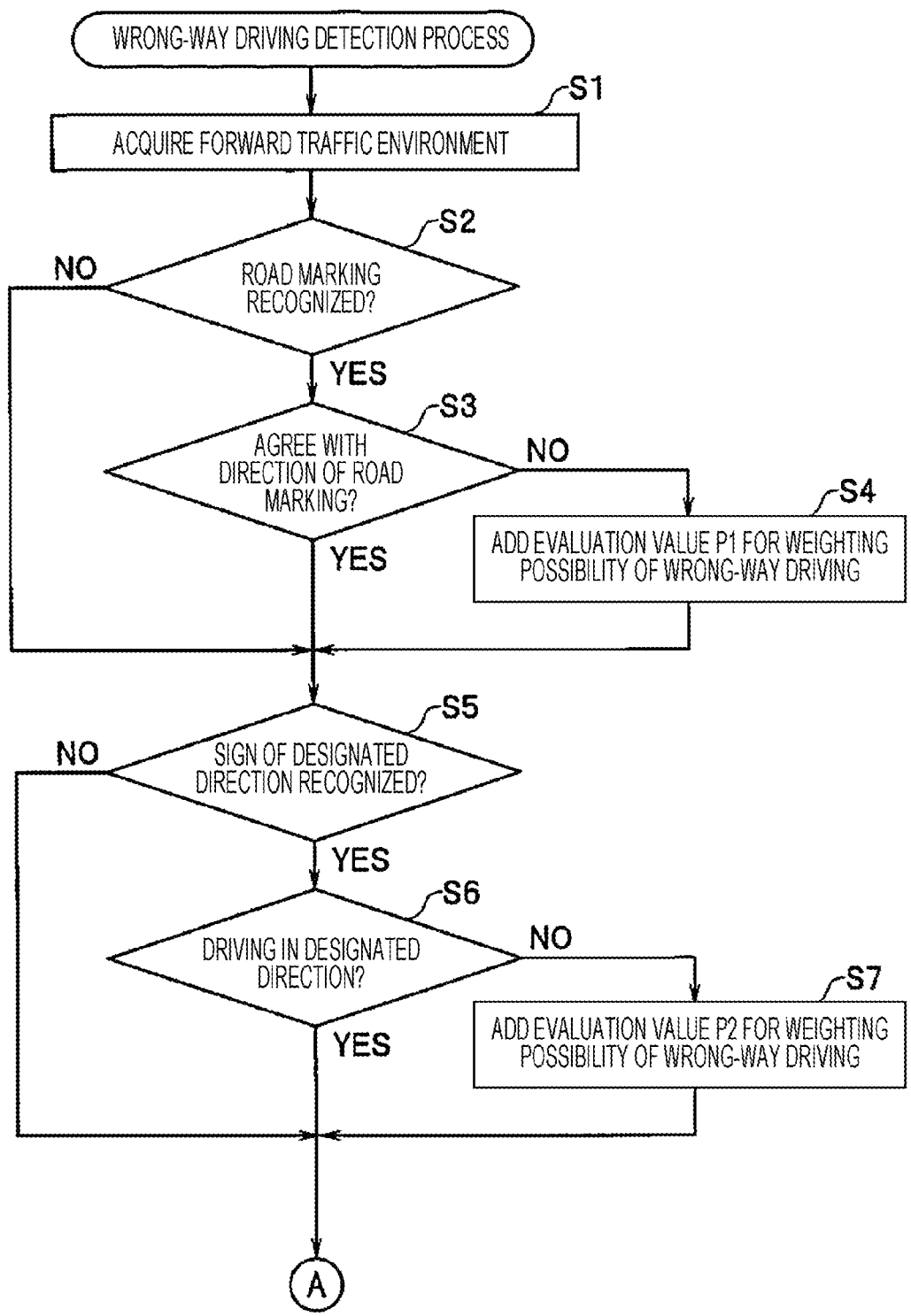
FIG. 5 is a control flowchart illustrating a wrong-way driving detection process executed by a driving control unit.

That is, the driving assistance apparatus 1 first executes a wrong-way driving detection process on the basis of the flowchart illustrated in FIG. 5. The restricted traffic zone is a work zone in this example, but is not limited to this. For example, the restricted traffic zone may be for cleanup after an accident, or the lane may be closed to traffic due to a landslide or rockfall.

(Wrong-Way Driving Detection Process)

The driving control unit 25 of the driving assistance apparatus 1 acquires a forward traffic environment (S1). The driving control unit 25 acquires forward traffic environment image information captured by the main camera 11a and the sub-camera 11b.

From the forward traffic environment image information, the driving control unit 25 determines whether a road marking is recognized (S2). The road marking is, for example, an arrow marked on the road to indicate the travel direction.

If the road marking is recognized (YES in S2), the driving control unit 25 determines whether the driving direction of the vehicle M agrees with the travel direction indicated by the road marking (S3). On the other hand, if the road marking is not recognized (NO in S2), the driving control unit 25 proceeds to step S5.

If the driving direction of the vehicle M does not agree with the travel direction indicated by the road marking (NO in S3), the driving control unit 25 adds an evaluation value P1 that quantifies the weighting of possibility of wrong-way driving (S4). On the other hand, if the driving direction of the vehicle M agrees with the travel direction indicated by the road marking (YES in S3), the driving control unit 25 determines, from the forward traffic environment image information, whether a sign indicating a designated travel direction of the lane being traveled by the vehicle M is recognized (S5).

If the sign indicating the designated travel direction is recognized (YES in S5), the driving control unit 25 determines whether the vehicle M is driving in the travel direction indicated by the sign (S6). On the other hand, if the sign indicating the designated travel direction is not recognized (NO in S5), the driving control unit 25 proceeds to step S8 (described below).

If the vehicle M is not driving in the travel direction indicated by the sign (NO in S6), the driving control unit 25 adds an evaluation value P2 that quantifies the weighting of possibility of wrong-way driving (S7).

Figure 6:
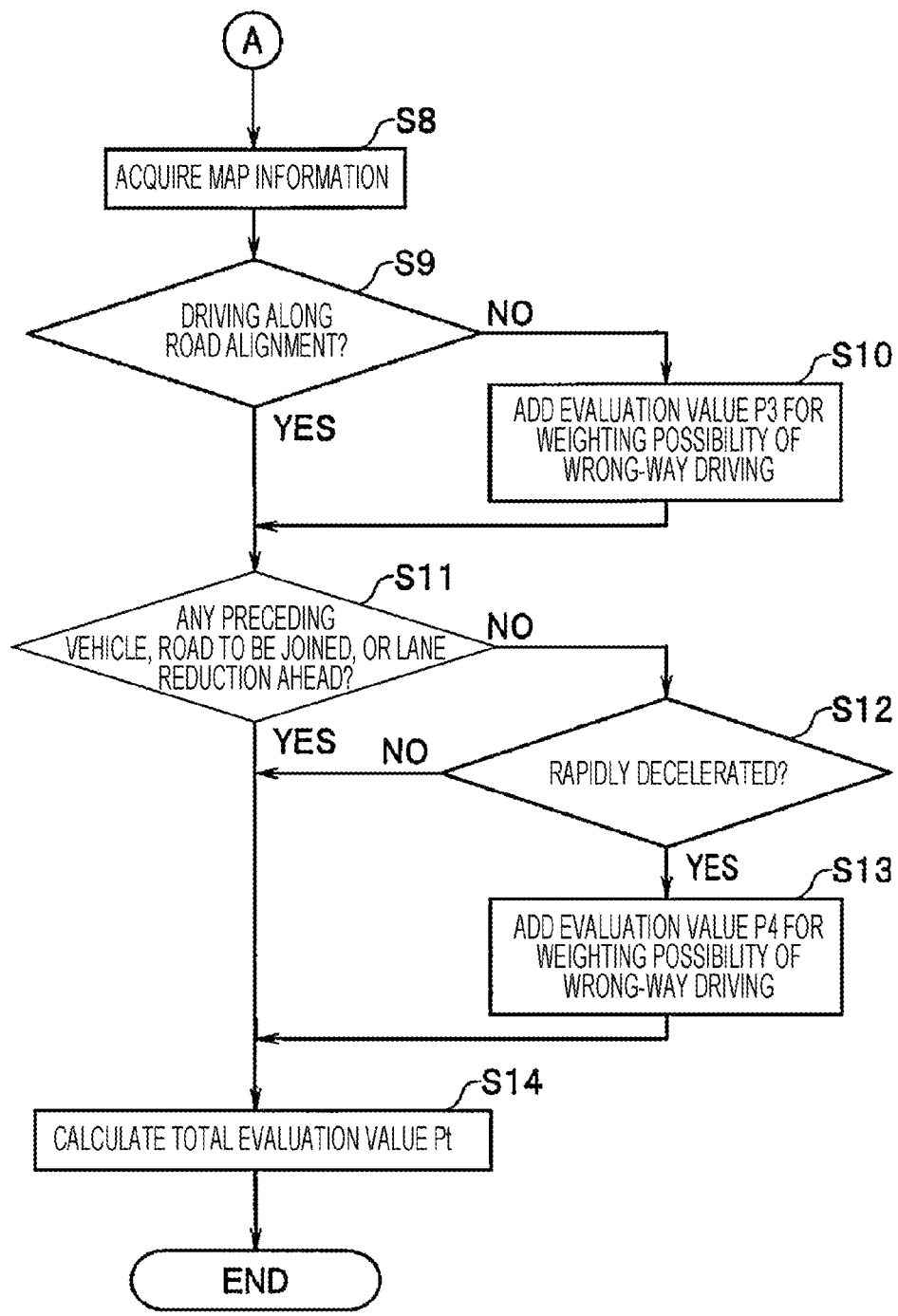
FIG. 6 is a control flowchart illustrating the wrong-way driving detection process continued from FIG. 5.

Next, the driving control unit 25 acquires map information (S8 in FIG. 6). The driving control unit 25 reads the map information stored in the road map database 16 in the locator unit 10 through the map information acquiring unit 12b.

Then, the driving control unit 25 determines whether the vehicle M is driving along the road alignment (S9). From the forward traffic environment image information, the driving control unit 25 determines whether the vehicle M is driving along the road alignment on the basis of, for example, the road curvature of the road being traveled by the vehicle M.

If the vehicle M is not driving along the road alignment (NO in S9), the driving control unit 25 adds an evaluation value P3 that quantifies the weighting of possibility of wrong-way driving (S10).

Next, from the forward traffic environment image information, the driving control unit 25 determines whether there is a preceding vehicle (vehicle OV), a road to be joined, or a lane reduction ahead (S11). If there is a preceding vehicle (vehicle OV), a road to be joined, or a lane reduction ahead (YES in S11), the driving control unit 25 proceeds to step S14 (described below).

On the other hand, if there is no preceding vehicle (vehicle OV), no road to be joined, and no lane reduction ahead (NO in S11), the driving control unit 25 determines whether the vehicle M has been rapidly decelerated (S12). The driving control unit 25 detects the rapid deceleration of the vehicle M from the operating condition of the braking control device under control of the brake controller 32, as well as from detection that is made, for example, by the vehicle velocity sensor and the forward and backward acceleration sensor of the autonomous driving sensor 14.

If rapid deceleration of the vehicle M is detected (YES in S12), the driving control unit 25 adds an evaluation value P4 that quantifies the weighting of possibility of wrong-way driving (S13). Then, the driving control unit 25 calculates a total evaluation value Pt by adding up the evaluation values P1 to P4 quantifying the weighting of possibility of wrong-way driving (S14) and ends the present control operation. The total evaluation value Pt is thus determined by adding up the evaluation values P1 to P4 obtained by quantification.

The evaluation values P1 to P4 obtained by quantifying the weighting of possibility of wrong-way driving are each appropriately determined in accordance with the significance of the determination item. The driving control unit 25 then executes an example of controlling a restricted traffic zone determination process illustrated in the flowchart of FIG. 7.

(Restricted Traffic Zone Determination Process)

First, the driving control unit 25 executes the wrong-way driving detection process illustrated in FIG. 5 and FIG. 6

(S21). The driving control unit 25 then determines whether the total evaluation value Pt for weighting the possibility of wrong-way driving, calculated in the wrong-way driving detection process in step S21, is greater than 0 (zero) (S22).

That is, if the total evaluation value Pt is greater than 0 (zero) (YES in S22), the driving control unit 25 determines that there is a possibility that the vehicle M is driving the wrong way in the oncoming lane 102.

If the total evaluation value Pt is not a value greater than 0 (zero), that is, if the total evaluation value Pt is 0 (zero) (Pt=0) (NO in S22), the driving control unit 25 determines that the vehicle M is driving forward in the forward lane 101, and returns to the wrong-way driving detection process in step S21.

On the other hand, if the total evaluation value Pt is greater than 0 (zero) (YES in S22), the driving control unit 25 acquires the forward traffic environment (S23) as in the case of step S1 in FIG. 5. Then, the driving control unit 25 determines whether there is a work zone ahead (S24). For example, from the forward traffic environment or Vehicle Information and Communication System (VICS) (registered trademark) information, the driving control unit 25 detects a work zone, which is a restricted traffic zone in the forward lane 101.

If a work zone is detected (YES in S24), the driving control unit 25 subtracts a subtraction value from the total evaluation value Pt (S25) and searches the forward traffic environment for a nearby vehicle (e.g., vehicle OV) (S26). The subtraction value subtracted from the total evaluation value Pt is a predetermined value, but may be varied, for example, in accordance with the number of driving lanes or the road condition.

On the other hand, if no work zone is detected (NO in S24), the driving control unit 25 searches the forward traffic environment for a nearby vehicle (e.g., vehicle OV) (S26). Other than searching the forward traffic environment for a nearby vehicle, the driving control unit 25 may search for a vehicle ahead, behind, or to the right or left side (i.e., a preceding vehicle, a succeeding vehicle, or a vehicle alongside) through vehicle-to-roadside-infrastructure (V2I) communication or vehicle-to-vehicle (V2V) communication.

The driving control unit 25 determines whether a nearby vehicle is detected (S27). If a nearby vehicle is detected (YES in S27), the driving control unit 25 detects the behavior of the nearby vehicle (S28). On the other hand, if no nearby vehicle is detected (NO in S27), the driving control unit 25 executes a calculation of a corrected evaluation value Pc in step S31 (described below).

The driving control unit 25 determines whether the vehicle M is behaving in the same way as the detected nearby vehicle (S29).

For example, the driving control unit 25 determines whether the vehicle M is following the vehicle OV, such as a preceding vehicle, or is driving forward in the same direction as the travel direction of the nearby vehicle. If no nearby vehicle is detected (NO in S27), the driving control unit 25 executes a calculation of the corrected evaluation value Pc in step S31 (described below).

If the vehicle M is behaving in the same way as the nearby vehicle moving forward (YES in S29), the driving control unit 25 subtracts a subtraction value from the total evaluation value Pt (S30). The subtraction value subtracted from the total evaluation value Pt is a predetermined value, but may be varied in accordance with the behavior of the vehicle M and the nearby vehicle.

For example, if the vehicle M is following the vehicle OV preceding the vehicle M, the subtraction value subtracted from the total evaluation value Pt is increased, whereas if the vehicle OV driving alongside or succeeding the vehicle M is detected and the vehicle OV preceding the vehicle M is not detected, then the subtraction value subtracted from the total evaluation value Pt is decreased.

From the total evaluation value Pt for weighting the possibility of wrong-way driving, calculated in the wrong-way driving detection process in step S21, the driving control unit 25 subtracts a predetermined value in step S25 and step S30 to calculate the corrected evaluation value Pc (S31).

If the vehicle M is behaving differently from the nearby vehicle (NO in S29), the driving control unit 25 executes a calculation of the corrected evaluation value Pc in step S31.

The driving control unit 25 then determines whether the corrected evaluation value Pc obtained by subtraction from the total evaluation value Pt is greater than or equal to a threshold (S32). The threshold is a predetermined condition value defined in such a way that if the corrected evaluation value Pc is less than the threshold, the possibility of wrong-way driving of the vehicle M can be determined to be low.

If the corrected evaluation value Pc is greater than or equal to the threshold (YES in S32), the driving control unit 25 executes a wrong-way driving determination process illustrated in FIG. 8 (S33). On the other hand, if the corrected evaluation value Pc is less than the threshold (NO in S32), the driving control unit 25 returns to the wrong-way driving detection process in step S21.

(Wrong-Way Driving Determination Process)

An example of controlling the wrong-way driving determination process illustrated in FIG. 8 will now be described.

First, since there is a possibility that the vehicle M is driving the wrong way, the driving control unit 25 actuates the alarm device 34 (S41). The driving control unit 25 actuates the alarm device 34 to give, for example, an alarm tone or alarm display to warn the driver that there is a possibility that the vehicle M is driving the wrong way.

The driving control unit 25 then determines whether a predetermined time has passed (S42). The driving control unit 25 repeatedly executes the determination routine in step S42 until the predetermined time passes. For example, the predetermined time is about three to five seconds.

After the predetermined time passes, the driving control unit 25 determines whether the vehicle M is driving in the forward lane 101 (S43). On the basis of the forward traffic environment recognized by the traffic environment recognizer 11*d*, the driving control unit 25 determines whether the vehicle M is driving in the forward lane 101, not driving in (or swerving into) the oncoming lane 102. That is, after the predetermined time passes, the driving control unit 25 determines whether actuating the alarm device 34 has made the driver notice the wrong-way driving in the oncoming lane 102 and return the vehicle M to the forward lane 101.

If determining that the vehicle M is driving in the forward lane 101 (YES in S43), the driving control unit 25 stops the operation of the alarm device 34 (S44) and ends the present control.

If the vehicle M is driving in (or swerving into) the oncoming lane 102, not driving in the forward lane 101 (NO in S43), then the driving control unit 25 executes return control for returning the vehicle M to the forward lane 101 (S45). On the basis of the forward traffic environment recognized by the traffic environment recognizer 11*d*, the driving control unit 25 actuates, for example, the steering controller 31, the brake controller 32, and the acceleration and deceleration controller 33 to execute automated driving control that returns the vehicle M (or causes the vehicle M to return) to the forward lane 101.

Then, in the same manner as in the routine of step S43, the driving control unit 25 determines whether the vehicle M is driving in the forward lane 101 (S46). The driving control unit 25 repeatedly executes the determination routine of step S46 during execution of the return control.

If determining that the vehicle M is driving in the forward lane 101 (YES in S46), the driving control unit 25 ends the return control, gives control to the driver (S47), proceeds to the routine of step S44, stops the operation of the alarm device 34, and ends the present control.

As described above, even when the vehicle M is driving in (or swerving into) the oncoming lane 102, not driving in the original forward lane 101, the driving assistance apparatus 1 according to the present embodiment detects a restricted traffic zone, such as a work zone for road work, and determines that the vehicle M is not driving the wrong way.

Thus, even when the vehicle M is driving in (or swerving into) the oncoming lane 102 on the map in the restricted traffic zone, the driving assistance apparatus 1 can prevent an erroneous determination of wrong-way driving and can prevent the alarm device 34 from giving an alarm.

With the configuration described above, the driving assistance apparatus 1 can prevent an erroneous determination of wrong-way driving when the vehicle M cannot drive in the original driving lane in the designated direction due to the presence of a restricted traffic zone.

Also, if wrong-way driving of the vehicle M is detected, the driving assistance apparatus 1 actuates the alarm device 34 to warn the driver and if the driver is still driving the wrong way in, or swerving into, the oncoming lane 102, the driving assistance apparatus 1 switches to automated driving control and causes the vehicle M to return to the forward lane 101.

The driving control unit 25 and the controllers 31, 32, and 33 of the driving assistance apparatus 1 for the vehicle M each include a processor that includes a central processing unit (CPU) and storage devices, such as a ROM and a RAM. All or some components of a plurality of circuits of the processor may be implemented by software. For example, various programs corresponding to functions, stored in the ROM, may be read and executed by the CPU.

All or some functions of the processor may be constituted by a logic circuit or an analog circuit, and various programs may be processed by an electronic circuit, such as a field-programmable gate array (FPGA).

The disclosure described in the embodiments is not limited to the embodiments and various modifications may be made without departing from the scope of the disclosure in the implementation phase. The embodiments described above include various stages of the disclosure, and various disclosures may be made by appropriately combining a plurality of constituent elements disclosed herein.

For example, even if some constituent elements described in the embodiments are removed, the resulting components, with the constituent elements removed, can still constitute the disclosure, as long as the problems described above can be solved and the effects described above can be achieved.

The locator unit 10 and the driving control unit 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the locator unit 10 including the map locator 12 and the road map database 16 and the driving control unit 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A driving assistance apparatus to be applied to a vehicle, the driving assistance apparatus comprising:
   an outside recognition device configured to acquire traffic environment information around the vehicle;
   a locator unit configured to store road map information and detect a position of the vehicle on a basis of a positioning signal; and
   a driving control unit configured to:
      control the vehicle based on the traffic environment information;
      execute a first determination process to determine whether the vehicle is performing wrong-way driving in an oncoming lane based on the traffic environment information, the road map information, and the position of the vehicle;
      in response to determining in the first determination process that the vehicle is performing the wrong-way driving in the oncoming lane, execute a second determination process to determine whether the vehicle is traveling in a section of the oncoming lane where such travel is permitted, based on the traffic environment information, and execute a third determination process to determine whether the vehicle is traveling in a same direction as a nearby vehicle based on the traffic environment information, the nearby vehicle being traveling surrounding the vehicle;
      determine whether the vehicle is performing the wrong-way driving in the oncoming lane based on the second and third determination processes;
      in response to determining in the second and third determination processes that the vehicle is not performing the wrong-way driving in the oncoming lane, discard a result of the first determination process and determine that the vehicle is not performing the wrong-way driving in the oncoming lane; and
      in response to determining in the second and third determination processes that the vehicle is performing the wrong-way driving in the oncoming lane, hold the result of the first determination process.

2. The driving assistance apparatus according to claim 1, further comprising an alarm device configured to give an alarm tone and alarm display to a driver who drives the vehicle,
   wherein the driving control unit is configured to, in response to determining in the second and third determination processes that the vehicle is performing the wrong-way driving in the oncoming lane, actuate the alarm device.

3. The driving assistance apparatus according to claim 2, wherein the driving control unit is configured to execute control that causes the vehicle to return to a driving lane on which the vehicle occupied prior to changing to the oncoming lane after the alarm device is actuated.

4. The driving assistance apparatus according to claim 1, wherein the nearby vehicle includes a preceding vehicle traveling in the same direction as the vehicle in front of the vehicle, and
wherein the driving control unit is configured to determine, in the third determination process, that the vehicle is traveling in the same direction as the nearby vehicle when the vehicle is following the preceding vehicle.

5. The driving assistance apparatus according to claim 4, wherein the driving control unit is configured to control, in response to the determining in the second and third determination processes that the vehicle is performing the wrong-way driving in the oncoming lane, the vehicle to return to a driving lane on which the vehicle occupied prior to changing to the oncoming lane from the oncoming lane.

6. The driving assistance apparatus according to claim 1, wherein the driving control unit is configured to control, in response to the determining in the second and third determination processes that the vehicle is performing the wrong-way driving in the oncoming lane, the vehicle to return to a driving lane on which the vehicle occupied prior to changing to the oncoming lane from the oncoming lane.

7. The driving assistance apparatus according to claim 1, wherein the first determination process includes:
generating a first evaluation value based on the traffic environment information, the road map information, and the position of the vehicle;
determining that the first evaluation value is not greater than a first threshold value;
in response to determining that the first evaluation value is not greater than a first threshold value, determining that the vehicle is not performing the wrong-way driving in the oncoming lane; and
in response to determining that the first evaluation value is greater than a first threshold value, executing the second and third determination processes.

8. The driving assistance apparatus according to claim 7, wherein the second determining process includes generating a second evaluation value based on whether the vehicle is traveling in the section of the lane designated for oncoming traffic where such travel is permitted,
wherein the third determining process includes generating a third evaluation value based on whether the vehicle is traveling in the same direction as a nearby vehicle, and
wherein the driving control unit is further configured to:
subtract the second evaluation value and the third evaluation value from the first evaluation value;
determine that the subtracted first evaluation value is equal to or greater than a second threshold value;
in response to determining that the subtracted first evaluation value is not equal to or greater than a second threshold value, determine the vehicle is not performing the wrong-way driving in the oncoming lane; and
in response to determining that the subtracted first evaluation value is equal to or greater than the second threshold value, determine the vehicle is performing the wrong-way driving in the oncoming lane.

9. A driving assistance apparatus to be applied to a vehicle, the driving assistance apparatus comprising:
circuitry configured to:
acquire traffic environment information around the vehicle;
store road map information;
detect a position of the vehicle on a basis of a positioning signal;
control the vehicle based on the traffic environment information;
execute a first determination process to determine whether the vehicle is performing wrong-way driving in an oncoming lane based on the traffic environment information, the road map information, and the position of the vehicle;
in response to determining in the first determination process that the vehicle is performing the wrong-way driving in the oncoming lane, execute a second determination process to determine whether the vehicle is traveling in a section of the oncoming lane where such travel is permitted, based on the traffic environment information, and execute a third determination process to determine whether the vehicle is traveling in a same direction as a nearby vehicle based on the traffic environment information, the nearby vehicle being traveling surrounding the vehicle;
determine whether the vehicle is performing the wrong-way driving in the oncoming lane based on the second and third determination processes;
in response to determining in the second and third determination processes that the vehicle is not performing the wrong-way driving in the oncoming lane, discard a result of the first determination process and determine that the vehicle is not performing the wrong-way driving in the oncoming lane; and
in response to determining in the second and third determination processes that the vehicle is performing the wrong-way driving in the oncoming lane, hold the result of the first determination process.

10. The driving assistance apparatus according to claim 9, wherein the circuitry includes:
generating a first evaluation value based on the traffic environment information, the road map information, and the position of the vehicle;
determining that the first evaluation value is not greater than a first threshold value;
in response to determining that the first evaluation value is not greater than a first threshold value, determining that the vehicle is not performing the wrong-way driving in the oncoming lane; and
in response to determining that the first evaluation value is greater than a first threshold value, executing the second and third determination processes.

11. The driving assistance apparatus according to claim 10,
wherein the second determining process includes generating a second evaluation value based on whether the vehicle is traveling in the section of the lane designated for oncoming traffic where such travel is permitted,
wherein the third determining process includes generating a third evaluation value based on whether the vehicle is traveling in the same direction as a nearby vehicle, and
wherein the circuitry is further configured to:
subtract the second evaluation value and the third evaluation value from the first evaluation value;
determine that the subtracted first evaluation value is equal to or greater than a second threshold value;
in response to determining that the subtracted first evaluation value is not equal to or greater than a second threshold value, determine the vehicle is not performing the wrong-way driving in the oncoming lane; and in response to determining that the subtracted first evaluation value is equal to or greater than the second threshold value, determine the vehicle is performing the wrong-way driving in the oncoming lane.

* * * * *